United States Patent [19]

Yamagiwa

[11] 4,077,047
[45] Feb. 28, 1978

[54] COLOR KILLER ENHANCEMENT IN A VIDEO SIGNAL RECORDING/PLAYBACK SYSTEM

[75] Inventor: Kazuo Yamagiwa, Tokyo, Japan

[73] Assignee: Sony Corporation, Tokyo, Japan

[21] Appl. No.: 705,798

[22] Filed: Jul. 16, 1976

[30] Foreign Application Priority Data

Jul. 21, 1975 Japan .................. 50-101075[U]

[51] Int. Cl.$^2$ .............................................. H04N 5/76
[52] U.S. Cl. ...................................................... 358/4
[58] Field of Search .................. 358/4, 8, 26; 360/25, 360/33

[56] References Cited

U.S. PATENT DOCUMENTS 3,975,759  8/1976  Taniguchi et al. ................ 358/4

Primary Examiner—Richard Murray
Attorney, Agent, or Firm—Lewis H. Eslinger; Alvin Sinderbrand

[57] ABSTRACT

A video recording/playback system having one or more rotary heads for recording and reproducing a video signal and a fixed head for recording and reproducing a tracking control signal is provided with an enhanced color killer feature. A characteristic of the color killer feature is that a color killer control signal is recorded together with a normal tracking control signal but does not affect the tracking control servo system during signal reproduction. The color killer control signal has a distinguishable characteristic which is detected during signal reproduction and is used to selectively operate a switch included in the usual chrominance signal channel of the recording/playback system.

16 Claims, 5 Drawing Figures

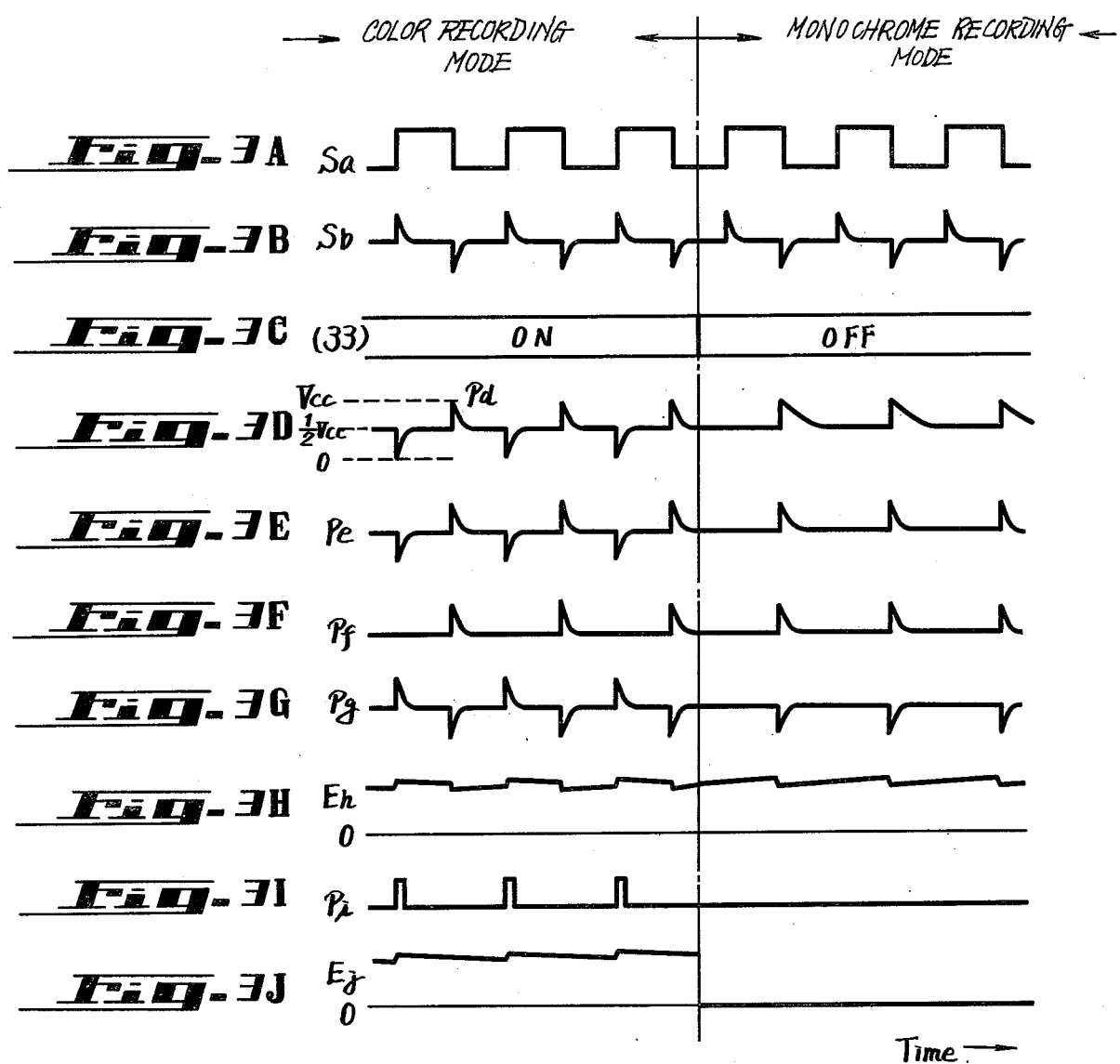

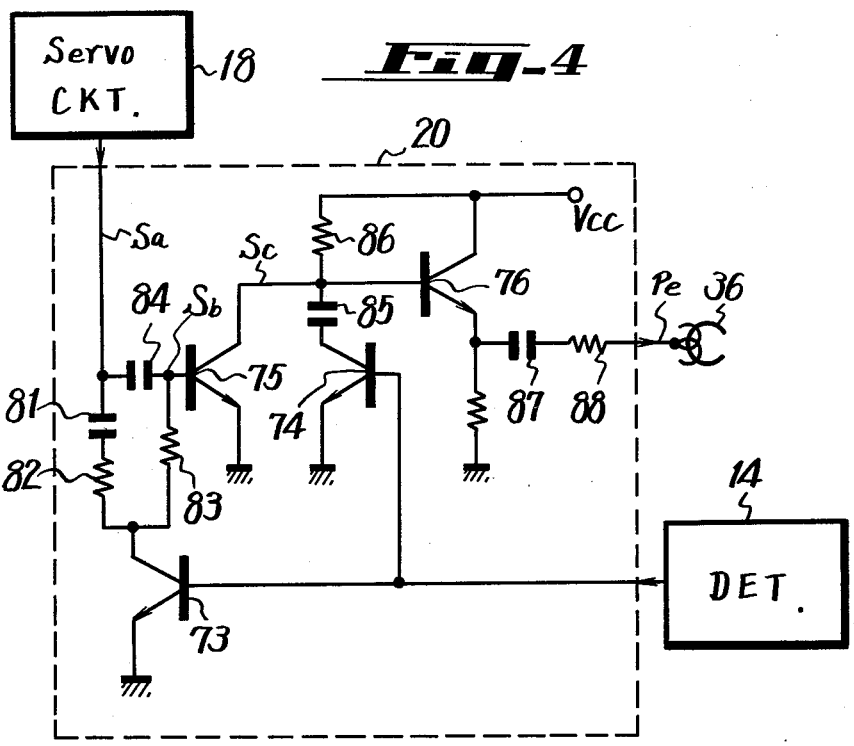

COLOR KILLER ENHANCEMENT IN A VIDEO SIGNAL RECORDING/PLAYBACK SYSTEM

BACKGROUND OF THE INVENTION

This invention relates to a video recording and/or playback system wherein the recorded video signal may be either a composite color video signal or a monochrome video signal and, more particularly, to apparatus used in such system wherein a mode control signal also is recorded to represent the type of recorded video signal so as to enhance a color killer operation during signal reproduction.

In a typical video signal recorder, such as a video tape recording system (VTR) intended for home entertainment use, a received color video signal is separated into its luminance signal component and its chrominance signal component, these respective components occupying different frequency bands. The luminance signal component is frequency modulated and the chrominance signal component, which includes the chrominance signals and a color burst signal, is frequency-converted to a lower band. Then, the frequency-modulated luminance signal component and the frequency-converted chrominance component are combined and recorded by, for example, one or more rotary magnetic heads. During reproduction, the recorded composite signal is separated into its respective components to enable the luminance component to be demodulated and the chrominance component to be frequency-reconverted to its original frequency band. Then, these restored components are combined and, typically, displayed as a color video picture.

In many of these video recording and/or playback systems, a color killer circuit is provided to suppress signals that might otherwise be transmitted through the chrominance channel during reproduction of a monochrome video signal. That is, when a color video signal is recorded and is to be displayed, the color killer circuit is disabled; but when a black-and-white video signal is recorded and is to be displayed, the color killer circuit is operated to suppress various harmonics and other signals that might be present in the chrominance channel. Typically, the determination as to whether a color or monochrome video signal is being recorded is dependent upon the level of the color burst signal. Since a color burst signal does not accompany a monochrome video signal, the absence of such a color burst signal may be assumed to represent that a monochrome video signal is being received. In many applications, a color burst signal detector is provided having a relatively low detecting, or threshold, level in order to provide a relatively sensitive color detector. It has been thought that this will enable accurate color signal recording and reproduction even if the color burst signal exhibits a low level. In this manner, the proper recording/playback mode, that is, a color or monochrome mode, will be established.

Unfortunately, the color detecting or threshold level may be set improperly with respect to a particular video signal that is being received. For example, if the threshold level is too low, noise that accompanies a monochrome video signal may be erroneously detected as a color burst signal. Hence, a color killer operation is defeated in this instance even though such an operation should be performed. Conversely, if the threshold level is too high, a low level color burst signal will not be detected, resulting in the erroneous performance of a color killer operation, whereby a color video picture will not be reproduced.

Operation of the color killer circuit is defeated erroneously when a monochrome signal having only a luminance signal component is recorded. This luminance signal component is recorded as a frequency-modulated signal, and its lower side band may fall within the frequency range normally associated with the chrominance channel. Thus, during reproduction, this lower side band may be interpreted as a frequency-converted color burst signal and, consequently, will be detected and used to defeat the operation of the color killer circuit. Thus, even though no chrominance signal component or color burst signal had been recorded, the color killer circuit nevertheless will be inhibited when the monochrome video signal is reproduced. This, of course, is contrary to the desired operation of the color killer circuit during black-and-white video picture reproduction.

OBJECTS OF THE INVENTION

Therefore, it is an object of the present invention to provide apparatus for enhancing a color killer operation in a video signal recording/playback system.

Another object of this invention is to provide apparatus for controlling a color killer operation in a video signal recording/playback system such that the color killer operation is not dependent upon the level of a color burst signal during video signal reproduction.

A further object of this invention is to provide a video recording/playback system wherein a color killer operation is performed properly when a monochrome video signal is reproduced, even if the reproduced monochrome video signal is accompanied by a relatively high-level noise signal whose frequency falls within the frequency band normally allocated to the chrominance signal band.

Yet another object of this invention is to provide a video recording/playback system having improved color killer apparatus.

A still further object of this invention is to provide improved color killer apparatus for use in a video recording/playback system wherein an additional mode control signal used to determine the selective operation of the color killer apparatus is recorded, but without requiring the provision of an additional recording head.

Various other objects, advantages and features of the present invention will become readily apparent from the ensuing detailed description, and the novel features will be particularly pointed out in the appended claims.

SUMMARY OF THE INVENTION

In accordance with the present invention, a video recording/playback system capable of recording either a composite video signal or a monochrome video signal is provided with apparatus for recording a mode control signal adapted to selectively control a color killer device during signal reproduction, the apparatus comprising a mode signal generator for generating a signal representing whether the recorded video signal is a composite color signal or a monochrome signal; a control signal generator for generating a control signal normally used for tracking during signal reproduction; a recording head for recording the control signal on the recording medium; and a circuit responsive to the signal produced by the mode signal generator for modifying the control signal such that a mode control signal also is recorded by the recording head.

In accordance with the teachings of this invention, the mode signal generator may be adapted to detect automatically whether the recorded video signal is a composite color signal or a monochrome signal, such as by detecting the presence and level of a color burst signal. Alternatively, the mode signal generator may be actuated manually so that the mode control signal is recorded even if the recording/playback system is recording a composite color signal.

In accordance with further teachings of the present invention, the recorded mode control signal is used during a signal reproducing operation to control selectively a color killer operation. That is, if the mode control signal is recorded when a composite color signal is recorded, thus indicating a color recording/playback mode, a color killer circuit is inhibited by such mode control signal during playback. Alternatively, if the mode control signal is not recorded, thus indicating a monochrome, or black-and-white, recording/playback mode, the color killer operation is carried out during signal playback.

In accordance with still additional teachings of the present invention, the mode control signal is superimposed on the control signal but exhibits distinguishing characteristics such that the mode control signal has substantially no effect upon the apparatus that utilizes the control signal and, likewise, the control signal has no effect upon the selective performance of the color killer operation.

BRIEF DESCRIPTION OF THE DRAWINGS

The following detailed description, given by way of example, will best be understood in conjunction with the accompanying drawings in which:

FIG. 3 is a timing diagram that graphically depicts various signals produced by the apparatus shown in FIGS. 1 and 2;

FIG. 4 is a schematic diagram showing another embodiment of recording apparatus in accordance with the present invention; and FIG. 5 is a timing diagram that graphically depicts the signals produced by the apparatus of FIG. 4.

DETAILED DESCRIPTION OF CERTAIN PREFERRED EMBODIMENTS

The present invention will be described in the environment of a mangetic recording/playback system and, in order to simplify the following description, the magnetic recording/playback system will be assumed to be a video tape recording (VTR) system. However, it should be readily understood that the teachings of the instant invention need not be limited solely to a magnetic recording medium. Also, if a magnetic medium is used, various media other than tape can be employed. Typically, other magnetic media with which the present invention can be used include a magnetic sheet, a magnetic disc, and the like.

Figure 1:
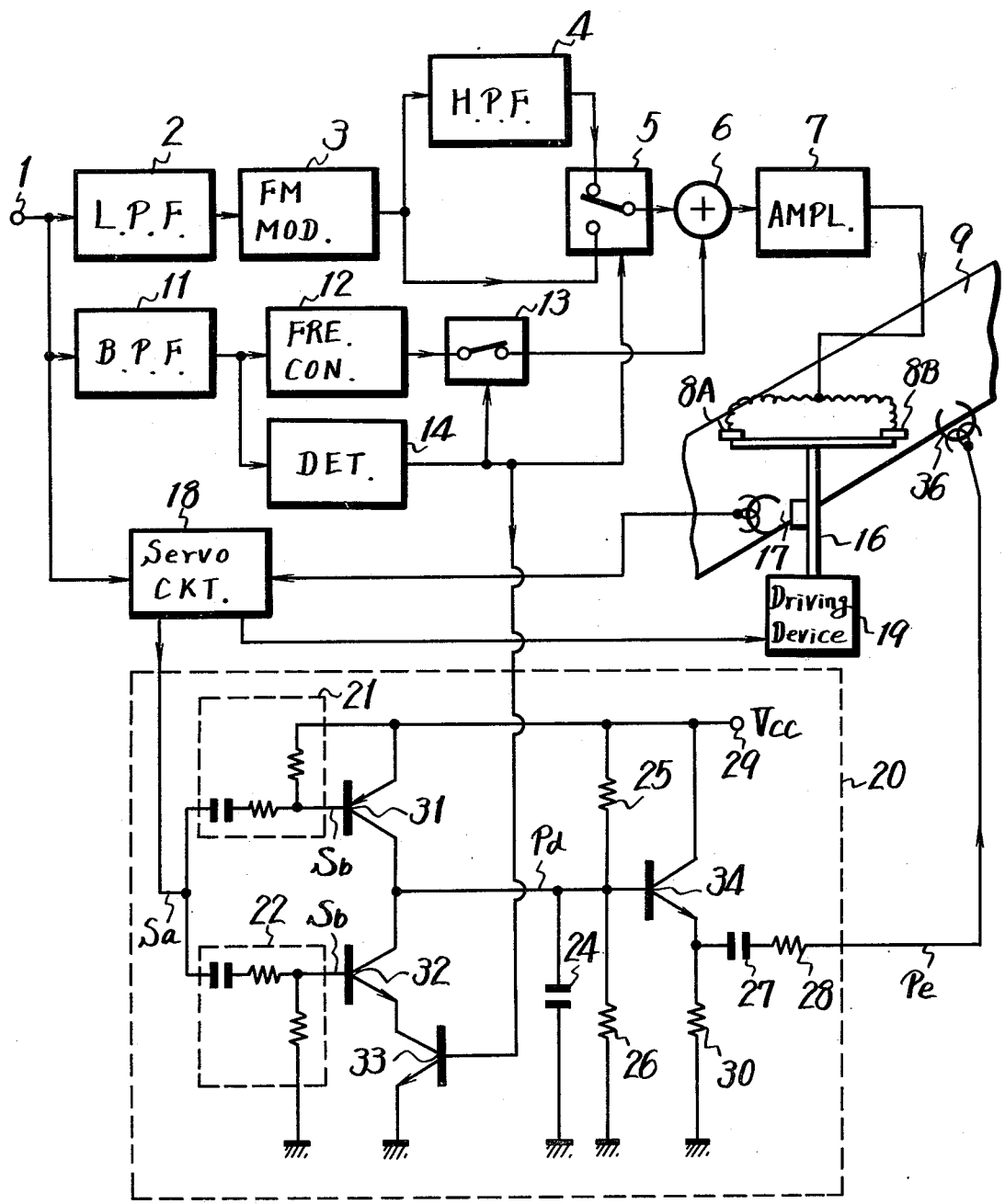
FIG. 1 is a partial block, partial schematic diagram showing one embodiment of recording apparatus in accordance with the present invention.

Referring now to FIG. 1, there is illustrated one embodiment of recording apparatus. Such apparatus may be constructed as a video recorder or, alternatively, may comprise the recording section of a recording/playback system. The illustrated recording apparatus is adapted to record either a composite color video signal of the type having a luminance component, chrominance components, a color burst signal, and other conventional synchronizing signals, or a monochrome video signal, such as a black-and-white signal, having a luminance component and various conventional synchronizing signals. Accordingly, the recording apparatus includes an input terminal 1 adapted to receive the video signal which may be supplied thereto as, for example, a broadcasted video signal, a closed circuit signal, or the like. The video signal received at input terminal 1 is adapted to be recorded on the recording medium, such as magnetic tape 9, by a pair of rotary magnetic heads 8A and 8B. Typically, these rotary heads may be spaced apart by 180° or, alternatively, only a single rotary head may be used.

The recording system is adapted to separate a received composite color video signal into separate frequency bands, to process the respective separated signals and then to combine such signals for recording. Accordingly, as shown, a luminance channel comprised of low-pass filter 2, frequency modulator 3, high-pass filter 4 and combining circuit 6 is connected to input terminal 1. Also, a chrominance channel comprised of band-pass filter 11, frequency converter 12 and a color killer device 13 is connected between input terminal 1 and combining circuit 6. Since the luminance signal component and chrominance signal component of a composite color video signal occupy different frequency bands, the low-pass filter 2 and band-pass filter 11 are effective to separate these respective components. As is conventional, the separated luminance component is frequency modulated in frequency modulator 3. The frequency-modulated luminance component is supplied to high-pass filter 4 in order to remove the lower side band component thereof. The filtered FM luminance component then is applied through changeover switch 5, to be described, to combining circuit 6. In one embodiment thereof, combining circuit 6 comprises an algebraic summing circuit.

Frequency converter 12 included in the chrominance channel is conventional and is adapted to convert the chrominance component to a lower frequency band than that of the frequency modulated luminance components. This frequency-converted chrominance component is supplied through color killer device 13 to combining circuit 6. As will be described below, for the purpose of the present discussion, color killer device 13 may be considered to be a switch.

The combined frequency-modulated luminance component and frequency-converted chrominance component, including the frequency-converted color burst signal, produced by combining circuit 6 is supplied through amplifier 7 to the respective rotary heads 8A and 8B. These heads are coupled to a rotary shaft 16 and driven by a driving device 19, such as a controlled motor, so as to be rotated at a speed corresponding to the frame frequency of the video signal. As a numerical example, heads 8A and 8B may be rotated at a speed of 30 rps corresponding to a frame frequency of 30Hz, whereby each head is adapted to record a video field.

The rotation of heads 8A and 8B is adapted to be synchronized with the frame frequency of the video signal received at input terminal 1. Accordingly, a tracking servo circuit 18 is provided for controlling driving device 19. A transducer 17, such as a magnetic element secured to shaft 16 and a magnetic pick-up fixedly disposed adjacent shaft 16, is provided to supply pulses to servo circuit 18, these pulses representing the position and speed of heads 8A and 8B. The servo circuit may include a frequency divider to which the vertical synchronizing signal included in the received composite signal is applied. Hence, after division, this frequency-divided signal is compared to the pulse signal generated by transducer 17 to produce an error signal used to control driving device 19. Thus, each skewed track scanned by heads 8A and 8B has a video field recorded therein.

The video recording apparatus thus far described is adapted to record a composite color video signal or a monochrome video signal, such as a black-and-white signal. In the event that a monochrome signal is to be recorded, it is desirable that the color killer device 13 be actuated so as to suppress any signals that may be present in the chrominance channel from being supplied to combining circuit 6. Also, it is preferred that the lower side band of the frequency-modulated monochrome signal not be eliminated therefrom. Accordingly, during a black-and-white recording mode, change-over switch 5 is actuated to connect the output of frequency modulator 3 directly to combining circuit 6 without passing through high-pass filter 4. Control over switch 5 and color killer device 13 is effected by a detector circuit 14. In one embodiment, detector circuit 14 is a level detector coupled to band-pass filter 11 and adapted to detect the level of the color burst signal transmitted through the band-pass filter. If this color burst signal exceeds a threshold level, representing the presence of a composite color video signal, detector circuit 14 actuates change-over switch 5 to its upper contact, as shown, and inhibits, or defeats, the operation of color killer device 13. Thus, in the presence of a composite color video signal, a color recording mode is established. However, in the absence of a color burst signal, such as when a monochrome video signal is received, or in the event that the color burst signal is less than the detector threshold level, change-over switch 5 is actuated to its lower contact so as to connect frequency modulator 3 directly to combining circuit 6, and the operation of color killer device 13 is enabled. Thus, if the color killer device comprises, for example, a switch, this switch is opened. Hence, a black-and-white recording mode is established.

In an alternative embodiment, detector circuit 14 may be actuated manually. Thus, a color recording mode or a black-and-white recording mode may be selectively established, regardless of the type of video signal that actually is received. Consequently, if desired, this manual actuation of detector circuit 14 may establish a black-and-white recording mode even though a composite color signal is applied to input terminal 1.

In the video recording apparatus illustrated in FIG. 1, a fixed head 36 is adapted to record a control signal in a predetermined control track on tape 9. Typically, this control signal may comprise a periodic signal whose frequency is synchronized with that of the vertical synchronizing signal included in the received composite video signal. This control signal then may be used during a reproduction operation to drive a servo circuit, similar to servo circuit 18, for controlling the tracking of rotary heads 8A and 8B. While the recording and use of such a control signal is conventional in video recording/playback apparatus, the present invention takes full account of the existence of control head 36 and the source of periodic control signals to produce a recording mode control signal that also is recorded on the control track of tape 9.

A circuit 20 is connected between servo circuit 18 and control head 36 and is adapted to receive periodic signals from the servo circuit synchronized with the vertical synchronizing signal and to produce the periodic control signal recorded on the control track by head 36. Circuit 20 also is coupled to detector circuit 14 and is responsive to a color recording mode indication to modify the periodic control signal so as to supply a superimposed mode control signal to head 36. As will be described below, the normal control signal and the mode control signal exhibit respective characteristics that are distinguishable and that are utilized by appropriate circuits in reproducing apparatus. Circuit 20 includes first and second differentiating circuits 21 and 22 connected in common to servo circuit 18 and adapted to receive a periodic signal Sa. Signal Sa is graphically depicted in FIG. 3A, and exhibits a frequency corresponding to the video frame frequency. As one example, signal Sa is a rectangular pulse signal having positive and negative intervals each substantially equal to a video field period. Differentiating circuits 21 and 22 are connected to complementary transistors 31 and 32 whose collector electrodes are connected in common. In one example, transistor 31 comprises a PNP transistor, while transistor 32 comprises an NPN transistor. The collector-emitter circuit of one of these transistors, such as transistor 32, is connected in series with the collector-emitter circuit of a switching transistor 33, the latter having its base electrode connected to receive a mode determining signal produced by detector circuit 14. In a preferred embodiment, when a color recording mode is established, detector circuit 14 supplies an energizing signal to transistor 33, thereby rendering this transistor conductive and enabling collector-emitter current to flow through transistor 32.

The common-connected collector electrodes of transistors 31 and 32 are connected to a capacitor 24 which, additionally, is connected to a voltage divider circuit formed of resistors 25 and 26 coupled across a source of energizing potential $V_{cc}$ applied to, for example, a power supply terminal 29. As will be discussed in greater detail below, capacitor 24 is adapted to be charged to a relatively higher level when transistor 31 is conductive and to be charged to a relatively lower level when transistor 32 is conductive. When transistor 31 and/or transistor 32 is rendered nonconductive, capacitor 24 is adapted to be discharged slowly through resistor 26 toward the voltage level determined by voltage divider resistors 25 and 26. An emitter-follower transistor 34 having an emitter load resistor 30 is coupled to capacitor 24 to supply the charging and discharging levels of this capacitor through a circuit formed of capacitor 27 and resistor 28 to control head 36.

The manner in which circuit 20 operates now will be described in conjunction with the waveform diagram shown in FIGS. 3A through 3E. Pulse signal Sa, synchronized with the received vertical synchronizing signal, is supplied by servo circuit 18 to differentiating circuits 21 and 22. Each of these differentiating circuits produces a positive pulse at each positive transition of signal Sa and a negative pulse at each negative transition of signal Sa. Accordingly, transistors 31 and 32 are supplied with positive-going and negative-going pulses Sb, respectively, as shown in FIG. 3B. Let it be assumed that a color recording mode is established and, therefore, detector circuit 14 supplies an energizing signal to transistor 33. Thus, transistor 33 may be considered to be ON during this color recording mode.

Since transistor 31 is assumed to be a PNP transistor, this transistor is rendered conductive only in response to negative pulses Sb. Conversely, since transistor 32 is assumed to be an NPN transistor, it is rendered conductive in response to the positive pulses Sb. Thus, transistors 31 and 32 are mutually exclusively conductive. Consequently, when transistor 31 conducts, current flows from terminal 29 through the emitter-collector circuit of transistor 31 to rapidly change capacitor 24. Conversely, since transistor 33 is ON, when transistor 32 is rendered conductive, capacitor 24 is rapidly charged in an opposite direction to a lower level. That is, a reference level, such as ground, is applied through the collector-emitter circuits of transistors 32 and 33 to capacitor 24. When neither transistor 31 nor transistor 32 is conductive, capacitor 24 is discharged toward the level determined at a relatively slower rate by voltage divider resistors 25 and 26. If it is assumed that these resistors are of equal value, then, when transistor 31 is conductive, capacitor 24 is charged rapidly to a voltage substantially equal to $V_{cc}$ and then, when transistor 31 is rendered non-conductive, is discharged slowly through resistor 26 toward the level $\frac{1}{2} V_{cc}$. Next, when transistor 32 is rendered conductive in response to a negative pulse Sb, capacitor 24 is rapidly charged to ground level. Then, when transistor 32 is non-conductive, capacitor 24 is discharged slowly through resistor 25 toward the level $\frac{1}{2} V_{cc}$. Thus, the voltage appearing across capacitor 24 appears as pulse signal Pd shown in FIG. 3D. These positive-going and negative-going pulses Pd are synchronized with signal Sa and are supplied through emitter-follower 34 and the circuit formed of capacitors 27 and 28 to be supplied as pulses Pe to control head 36.

Now, let it be assumed that a monochrome recording mode is established such that transistor 33 is not supplied with an energizing signal from detector circuit 14 and, therefore, is turned OFF, as shown in FIG. 3C. Thus, when differentiating circuits 21 and 22 produce the positive-going and negative-going pulses Sb, as shown in FIG. 3B, transistor 31 is turned ON by each negative-going pulse Sb to charge capacitor 24 to the level $+V_{cc}$, but transistor 32 cannot supply ground-level voltage to capacitor 24 because transistor 33 remains non-conducting. Consequently, capacitor 24 periodically is charged to the level $V_{cc}$ and then discharges through resistor 26 to produce only positive-going pulses, as shown in FIG. 3D. But, since transistor 33 is non-conductive during the monochrome recording mode, capacitor 24 is inhibited from producing negative-going pulses as had been produced during the color recording mode. These positive-going pulses produced by capacitor 24 are supplied through emitter-follower 34 and the circuit formed of capacitors 27 and 28 to control head 36 in the form of pulses Pe, shown in FIG. 3E.

As will be described with respect to FIG. 2, the positive-going pulses supplied to control head 36 during both the color recording mode and the monochrome recording mode are used in the video signal reproducing apparatus to control the tracking of the rotary magnetic heads. The superimposed negative-going pulses recorded on the control track by control head 36 are used to control selectively a color killer operation. That is, the presence of such superimposed negative-going pulses is used to represent a color recording mode and, therefore, to inhibit a color killer operation. Conversely, the absence of such negative-going mode control pulses is used to represent a monochrome recording mode and; therefore, to initiate positively a color killer operation.

Figure 2:
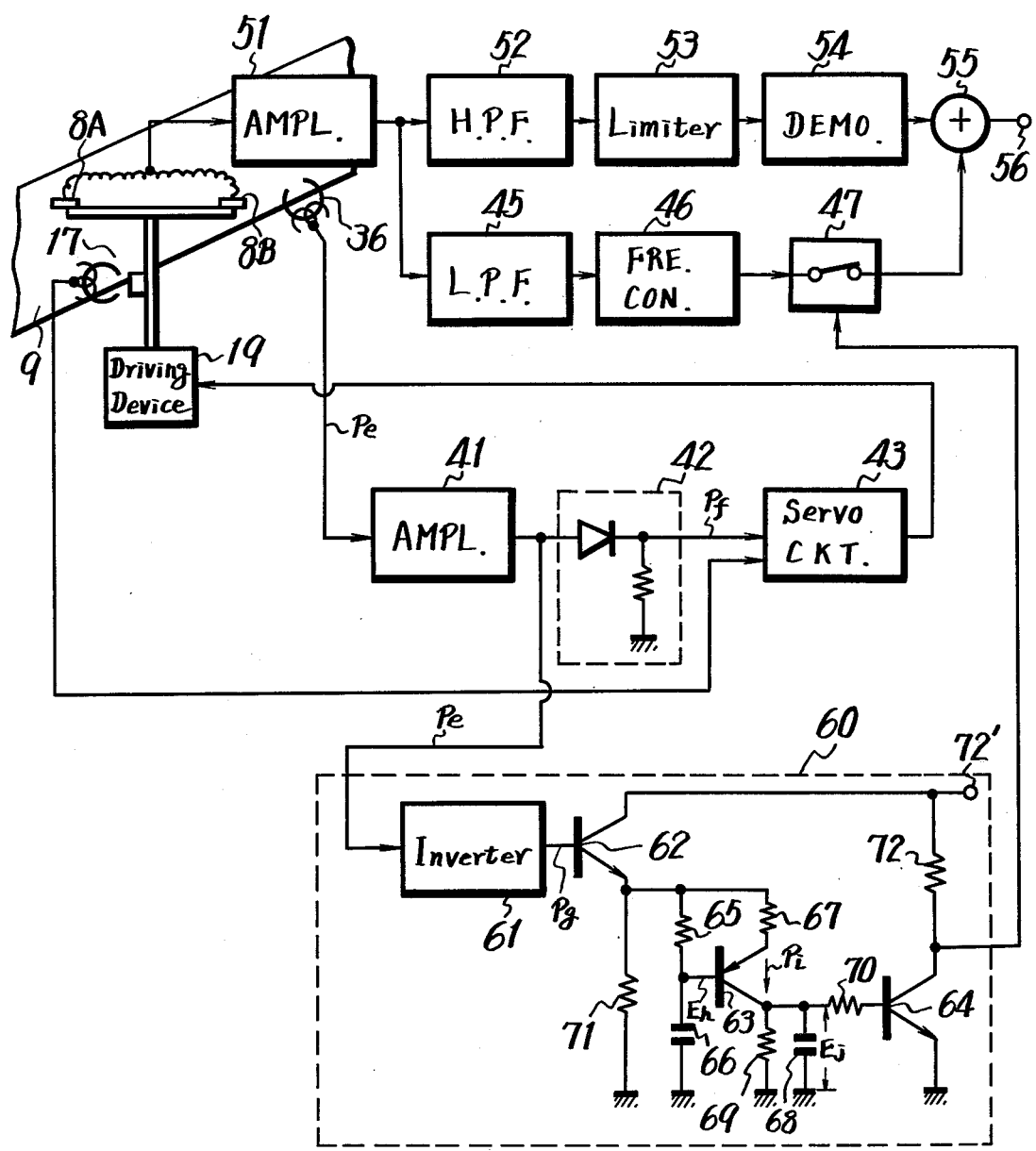
FIG. 2 is a partial block, partial schematic diagram showing one embodiment of reproducing apparatus in accordance with the present invention.

Turning now to FIG. 2, there is illustrated one embodiment of reproducing apparatus which may be used with the teachings of the present invention. This reproducing apparatus can be incorporated into the playback section of a record/playback device wherein the apparatus shown in FIG. 1 constitutes the recording section or, alternatively, the reproducing apparatus of FIG. 2 may comprise a separate video signal playback system. In either event, it will be assumed that the illustrated reproducing apparatus is adapted to recover the video signals previously recorded on, for example, magnetic tape 9. As is typical in many video signal reproducing devices, rotary heads 8A and 8B are driven by a driving device 19 at a rate corresponding to the frame frequency of a video signal. Thus, heads 8A and 8B scan successive fields of the recorded video signal. An amplifier 51 supplies the outputs of heads 8A and 8B sequentially to a luminance channel and to a chrominance channel wherein the respective luminance and chrominance components are recovered and then combined in a combining circuit 55, such as an algebraic summing circuit, to supply a composite video signal to output terminal 56. A high-pass filter 52 and a low-pass filter 45 in the luminance and chrominance channels, respectively, serve to separate these components from the composite recorded signal. A limiter 53, coupled to high-pass filter 52, supplies the separated, frequency-modulated luminance component to a frequency demodulator 54 whereat the original luminance component is recovered. In the chrominance channel, a frequency re-converter 46 serves to reconvert the converted chrominance signals, that is, the converted color signals and color burst signals, to their original frequency bands. Then, the frequency re-converted chrominance signals are supplied through a color killer circuit 47 to combining circuit 55. In a preferred embodiment, color killer circuit 47 comprises a switching circuit that selectively transmits the frequency re-converted chrominance signals during a color playback mode, and prevents the transmission of, for example, noise signals or the like, from frequency re-converter 46 to combining circuit 55 during a monochrome playback mode.

A control head 36, which may be the same as control head 36 described previously in respect to FIG. 1, is fixedly positioned adjacent a control track to recover control signals Pe of the type shown in FIG. 3E. These recovered control signals are supplied through an amplifier 41 and a rectifier circuit 42 to one input of a servo circuit 43. Another input of servo circuit 43 is adapted to receive pulses representing the position and rotational speed of heads 8A and 8B. For this purpose, a transducer 17, similar to previously described transducer 17 of FIG. 1, supplies to servo circuit 43 pulses representing the position of heads 8A and 8B. Servo circuit 43 is adapted to compare control pulses recovered by control head 36 representing the desired position of heads 8A and 8B to the pulses produced by transducer 17 representing the actual position of these rotary heads. An error signal is produced by the servo circuit to control driving device 19 such that the actual position (and, thus, speed) of the rotary heads is controlled to be equal to the desired position thereof.

In addition to supplying signal Pe to servo circuit 43, amplifier 41 also supplies this signal to a color killer control circuit 60. As shown in FIG. 2, control circuit 60 is comprised of inverter 61 adapted to invert the polarity, or sense, of control signal Pe supplied thereto. An emitter-follower transistor 62 is coupled to inverter 61 and has an emitter load resistor 71. The output of emitter-follower transistor 62 is supplied through a time-constant circuit formed of resistor 65 and series-connected capacitor 66 to the base electrode of a transistor 63. The output of the emitter-follower transistor also is supplied through a resistor 67 to the emitter electrode of transistor 63. Preferably, transistor 63 comprises a PNP transistor. Resistor 65 and capacitor 66 are connected between the emitter electrode of emitter-follower transistor 62 and a reference potential, such as ground, this circuit exhibiting a relatively high time constant. Consequently, when a signal is supplied to transistor 63 by emitter-follower transistor 62, it requires a longer time, as determined by the time constant of resistor 65 and capacitor 66, for the base voltage of transistor 63 to reach a level substantially equal to the emitter voltage of this transistor.

The collector electrode of transistor 63 is connected through an integrator circuit formed of parallel-connected capacitor 68 and resistor 69 to a current-limiting resistor 70 coupled to the base electrode of a transistor 64. As will soon be explained, when a superimposed mode control signal representing that the video signals have been recorded in a color recording mode are reproduced by head 36, current pulses are supplied through transistor 63 to charge capacitor 68 so as to supply a DC signal of predetermined level to transistor 64. Resistor 69 permits capacitor 68 to discharge at a much slower rate. Thus, the purpose of the integrator circuit is to convert current pulses to a DC level. The collector electrode of transistor 64 is coupled through a collector load resistor 72 to a power supply terminal 72' and, additionally, is coupled to a control terminal of color killer circuit 47. In this manner, when transistor 64 is rendered conductive, or turned ON, color killer circuit 47 is inhibited from performing a color killer operation. In the event that color killer circuit 47 comprises a switching device, this device is turned ON to supply the output of frequency re-converter 46 to combining circuit 55. Conversely, in the event that transistor 64 is rendered non-conductive, or turned OFF, the color killer operation is enabled, and switching device 47 is turned OFF.

Let it be assumed that the video signals recorded on tape 9 have been recorded in a color recording mode. Hence, control signals Pe are recorded as servo control signals and superimposed mode control signals as depicted in the left-hand portion of FIG. 3E. When these control signals Pe are reproduced, rectifier circuit 42 is conductive to transmit only the positive-going pulses to servo circuit 43, as shown in FIG. 3F. As is appreciated, servo control pulses Pf are compared to the pulses generated by transducer 17 to control the tracking of rotary heads 8A and 8B.

In addition, recovered control signals Pe are inverted by inverter 61 to supply inverted control pulses Pg to emitter-follower 62, as shown in FIG. 3G. If this emitter-follower is biased to transmit both the positive-going and negative-going pulses Pg, such pulses are applied through resistor 67 to the emitter electrode of transistor 63 and through the time constant circuit formed of resistor 65 and capacitor 66 to the base electrode of this transistor. Thus, since it requires a predetermined time duration for capacitor 66 to charge in response to the positive-going and negative-going pulses Pg, it is seen that, when a positive-going pulse is applied, the emitter electrode of transistor 63 initially receives a higher voltage than does its base electrode. Consequently, transistor 63 is turned ON during this predetermined time duration to supply a pulse Pi to the integrator circuit formed of capacitor 68 and resistor 69. Accordingly, pulses Pi, which are produced in response to each negative-going pulse Pe, are integrated to supply a relatively positive DC level Ej to transistor 64. This turns transistor 64 ON to correspondingly turn switching device 47 ON. Hence, a color killer operation is defeated and the frequency reconverted chrominance signals are supplied through switching device 47 to combining circuit 55 during a color playback mode.

When the negative-going pulses Pg, corresponding to the positive-going, or servo control pulses Pe, are supplied to transistor 63, the emitter electrode of this transistor initially is supplied with a lower voltage than is its base electrode. Hence, transistor 63 is prevented from turning ON in response to each negative-going pulse Pg. Therefore, only pulses Pi produced in response to the positive-going pulses Pg (i.e., the negative-going control mode pulses Pe) are integrated to turn transistor 64 and switching device 47 ON.

Now, let it be assumed that control head 36 does not recover any superimposed negative-going control mode pulses Pe. This, of course, occurs when video signals had been recorded in the monochrome recording mode. It is recognized that, during a monochrome playback mode, a color killer operation should be performed. When only positive-going servo control pulses Pe are reproduced, rectifier circuit 42 supplies such servo control pulses Pf to servo circuit 43. Thus, servo circuit 43 is supplied with substantially the same types of pulses regardless of the particular playback mode, and driving device 19 is suitably controlled to properly track heads 8A and 8B.

As shown in the right-hand portion of FIG. 3G, servo control pulses Pe are inverted by inverter 61 and supplied as negative-going pulses Pg to emitter-follower 62. Each such negative-going pulse is supplied by emitter-follower 62 to transistor 63. As shown in FIG. 3H, each negative-going pulse Pg is supplied through the time constant circuit formed of resistor 65 and capacitor 66 to the base electrode of transistor 63 as the DC level Eh. Since this DC level is greater than the pulse signal Pg supplied to the emitter electrode of transistor 63, this transistor remains in its non-conductive, or OFF, state throughout the monochrome playback mode. Therefore, current pulses are not supplied to the integrator circuit formed of capacitor 68 and resistor 69, as shown in FIG. 3I, resulting in a substantially 0 DC level supplied to transistor 64. Since transistor 64 is maintained in its OFF condition by this DC level, switching device 47 also is turned OFF. Hence, the color killer operation is performed and the output of frequency reconverter 46 is prevented from being supplied to combining circuit 55.

In view of the foregoing description of FIG. 2, it should be readily appreciated that the recording of superimposed mode control signals, represented as the negative-going pulses Pe, effectively determines the playback mode and enhances the color killer operation. That is, if the superimposed mode control signal is present, a color killer operation is defeated. Conversely, if there are no superimposed mode control signals, the color killer operation is carried out. Since these mode control signals are superimposed on the normal control track of the video signal recording medium, and since such superimposed mode control signals have no effect upon the servo operation that usually is controlled by the normally recorded servo control pulses, it is seen that the present invention does not require any significant modification of existing recording/playback systems, nor is there a requirement for an additional control head and a corresponding control track.

Hence, in accordance with the teachings of the present invention, if a received video signal is a color video signal having a relatively weak color burst signal, both the recording apparatus and the playback apparatus are controlled to establish a monochrome mode. Hence, there is no danger of defeating a color killer operation which properly should be carried out when weak color video signals are recorded.

As alternative embodiments of the above-described apparatus, it should be appreciated that, if desired, the superimposed mode control signal recorded in the control track may represent that a color killer operation should be performed and, therefore, the absence of such a superimposed mode control signal can be used to represent that a color killer operation should be defeated. As yet another alternative, the mode control signal can be recorded by the normal audio signal recording head (not shown) that usually is provided in a video recording system. Thus, the mode control signal can be superimposed upon the audio track rather than the control track as described above.

Referring now to FIG. 4, there is illustrated another embodiment of mode control signal recording apparatus. Like reference numerals are used in FIG. 4 to identify the same circuit components previously described in respect to FIG. 1. Accordingly, mode control signal recording circuit 20 is supplied with a periodic signal Sa by servo circuit 18 and, additionally, with a DC level from detector circuit 14 representing whether a color recording mode or monochrome recording mode should be established. The signal produced by detector circuit 14 is supplied to transistor 73 and exhibits a relatively low level representing a color recording mode and a relatively higher level representing a monochrome recording mode. Thus, transistor 73 is rendered nonconductive, or turned OFF, during a color recording mode and is rendered conductive, or turned ON, during a monochrome recording mode.

Signals Sa produced by servo circuit 18 are supplied through two parallel paths to the collector electrode of transistor 73. A first of these parallel paths is comprised of a capacitor 81 connected in series with a resistor 82, and the second parallel path is comprised of a capacitor 84 connected in series with a resistor 83. The junction defined by capacitor 84 and resistor 83 is coupled to the base electrode of a transistor 75. The collector-emitter circuit of transistor 75 is connected in parallel with a circuit formed of a capacitor 85 series-connected to the collector-emitter circuit of a transistor 74. The common junction defined by these parallel transistor circuits is coupled to a source of operating potential $V_{cc}$ by a load resistor 86 and, additionally, through an emitter-follower transistor 76, a capacitor 87 and a resistor 88 to control head 36. In addition, the base electrode of transistor 74 is coupled to detector circuit 14 to be turned OFF and ON depending upon the recording mode established by the detector circuit.

In operation, let it be assumed that detector circuit 14 establishes a color recording mode. Hence, transistors 73 and 74 each are turned OFF. The periodic signal Sa supplied by servo circuit 18, shown in FIG. 5A, merely is ac coupled through capacitor 84 to transistor 75 as periodic signal Sb, and is inverted by this transistor to produce pulses Sc as shown in FIG. 5C. Since transistor 74 has been turned OFF, capacitor 85 has no appreciable effect upon pulses Sc. Accordingly, these pulses are supplied through emitter-follower 76 and are differentiated by capacitor 87 and resistor 88 to be applied as positive-going and negative-going pulses Pe to control head 36. Hence, as in the embodiment previously described in respect to FIG. 1, servo control pulses of one polarity are provided with superimposed mode control pulses of the opposite polarity, both sets of control pulses having the same frequency and being recorded on the same control track by head 36.

Now, let it be assumed that detector circuit 14 establishes the monochrome recording mode, thereby turning transistors 73 and 74 ON. Since transistor 73 is ON, capacitor 81 and resistor 82, as well as resistor 83, now are effectively connected in circuit with capacitor 84. This connection functions as a differentiator circuit to supply transistor 75 with positive-going and negative-going pulses Sb at each positive and negative transition, respectively, of signal Sa, as shown in FIG. 5B.

Transistor 75 normally is maintained in its OFF condition except when positive-going pulses Sb are applied thereto. Since transistor 74 has been turned ON by detector circuit 14, capacitor 85 can be charged through resistor 86 toward the operating potential level $V_{cc}$ when transistor 75 is OFF. However, once transistor 75 is turned ON, the charged capacitor 85 rapidly is discharged through this transistor. Accordingly, a substantially sawtooth-shaped waveform is produced across capacitor 85 during the monochrome recording mode, as shown in FIG. 5C. This capacitor voltage is supplied through emitter-follower 76, and the negative-going discharge portions are differentiated by capacitor 87 and resistor 88 to apply negative-going servo control pulses Pe to control head 36. The periodic positive-going mode control pulses that had been applied during the color recording mode now are not superimposed onto the servo control pulses. Since pulses Pe exhibit peaks that are substantially equal to the operating voltage level $V_{cc}$, these pulses are capable of being accurately detected during a video signal reproducing operation.

In the embodiment shown in FIG. 4 and described in conjunction with the waveform diagrams of FIG. 5, the servo control pulses are depicted as negative-going pulses and the superimposed mode control pulses are depicted as positive-going pulses. These respective control pulses can be utilized in the system of FIG. 2 in the manner described hereinabove if inverter circuit 61 is coupled to the input of rectifier circuit 42. Alternatively, inverter circuit 61 can be omitted and rectifier circuit 42 may be provided with a diode poled in a direction opposite to that shown in FIG. 2.

While the present invention has been particularly shown and described with reference to preferred embodiments thereof, it should be readily apparent that various modifications in form and details may be made by one of ordinary skill in the art without departing from the spirit and scope of the invention. Therefore, it is intended that the appended claims be interpreted as including all such changes and modifications.

What is claimed is:

1. In an apparatus for recording and/or reproducing a video signal having a predetermined characteristic indicative of whether said video signal is a composite color video signal or a monochrome video signal, and in which said video signal is recorded on a magnetic medium by at least one rotary head; a mode control signal generating means for generating a mode control signal representative of said predetermined characteristic, and a fixed head receiving said mode control signal for recording the same on said magnetic medium.

2. The apparatus of claim 1; further comprising means for producing an additional signal which is also supplied to said fixed head for recording by the latter on said magnetic medium.

3. The apparatus of claim 2; wherein said means for producing an additional signal includes means responsive to a vertical synchronizing signal component of said video signal to produce a periodic signal and tracking control signal generating means responsive to said periodic signal to produce a tracking control signal.

4. The apparatus of claim 3; wherein said predetermined characteristic comprises a color burst signal, said color burst signal being present in said composite color video signal and being absent from said monochrome video signal; and wherein said mode control signal generating means includes a burst signal detector for generating a mode indication signal depending upon the presence or absence of said color burst signal.

5. The apparatus of claim 4; wherein said tracking control signal is used during a reproduction operation of said apparatus for synchronizing the rotation of said rotary head, and said fixed head is associated with a control track on said magnetic medium; and wherein said mode control signal generating means includes means responsive to said periodic signal and responsive to said mode indication signal to modify the waveform of said periodic signal so as to superimpose said mode control signal onto said tracking control signal for recording by said fixed head when said color burst signal exceeds a threshold level.

6. The apparatus of claim 5; wherein said tracking control signal generating means includes a first pulse generator means for producing positive-going and negative-going pulses in response to said periodic signal and a first switch means for supplying selected ones of said positive-going and negative-going pulses to said fixed head; and wherein said mode control signal generating means includes a second pulse generator means for producing positive-going and negative-going pulses in response to said periodic signal and a second switch means for supplying selected ones of said positive-going and negative-going pulses to said fixed head.

7. The apparatus of claim 6; wherein said mode control signal generating means further includes capacitance means adapted to be charged in one direction by said positive-going pulses and to be charged in an opposite direction by said negative-going pulses; discharge means coupled to said capacitance means to discharge said capacitance means at a rate slower than the rate at which said capacitance means is charged in the absence of positive-going and negative-going pulses, an output means coupled to said fixed head for supplying period signals thereto in response to the charging and discharging of said capacitance means; and wherein said first and second switch means selectively inhibits said positive-going pulses and said negative-going pulses from charging said capacitance means.

8. The apparatus of claim 1; further comprising means for reproducing said video signal including a luminance channel for reproducing a luminance signal component from said magnetic medium, and a chrominance channel for reproducing a chrominance signal component from said magnetic medium, said chrominance channel including color killer means; and further comprising means for reproducing a recorded signal recorded by said fixed head on said magnetic medium; said recorded signal including said mode control signal; and color killer control means responsive to said mode control signal for selectively operating said color killer means.

9. The apparatus of claim 8; wherein said recorded signal further includes a tracking control signal; said apparatus further comprising servo means for controlling the rotation of said rotary head during a signal reproduction operation in response to said tracking control signal, said tracking control signal and said mode control signal being reproduced by said fixed head and supplied to said servo means and to said color killer control means.

10. The apparatus of claim 9; wherein said tracking control signal is periodic and said mode control signal is superimposed onto said tracking control signal, and said servo means is not responsive to said mode control signal.

11. The apparatus of claim 9; wherein said tracking control signal comprises periodic pulses of a first polarity and said mode control signal comprises periodic pulses of a second polarity, and wherein said servo means includes rectifier means for transmitting pulses only of said first polarity; and said color killer control means includes means responsive to the absence of pulses of said second polarity for applying a color killer signal to said color killer means and responsive to pulses of said second polarity for inhibiting said color killer signal.

12. The apparatus of claim 11; wherein said color killer control means comprises a capacitor adapted to be charged and substantially maintain its charge in response to said pulses of said second polarity and to be discharged and substantially remain discharged in response to the absence of said pulses of said second polarity; and an output transistor responsive to the charged level of said capacitor for selectively producing said color killer signal.

13. The apparatus of claim 12; wherein said color killer control means further comprises an input transistor coupled to said capacitor and responsive to said pulses of said second polarity to conduct a capacitor charging current for charging said capacitor; and discharge means coupled to said capacitor for discharging said capacitor at a relatively slow rate in the absence of a capacitor charging current, such that said capacitor is discharged when said input transistor is not conductive for a predetermined duration.

14. In an apparatus for recording and/or reproducing a video signal having a predetermined characteristic indicative of whether said video signal is a composite color or monochrome signal; means for reproducing said video signal which is received from a magnetic medium by at least one rotary head, said magnetic medium having a control track upon which a tracking control signal is recorded for controlling a servo means to synchronize the rotation of said rotary head, and said control track selectively including a mode control signal representing whether said video signal is a composite color signal or a monochrome signal; said means for reproducing the video signal comprising:
- a luminance channel coupled to said rotary head for recovering a luminance component of said video signal during a reproduction operation;
- a chrominance channel coupled to said rotary head for recovering a chrominance component of said video signal during a reproduction operation;
- switch means coupled to said chrominance channel for selectively inhibiting the output thereof;
- a fixed head associated with said control track to reproduce said tracking control signal and said selectively recorded mode control signal;
- discriminating means coupled to said fixed head for separating said mode control signal from said tracking control signal and for applying said tracking control signal to said servo means;
- and switch control means coupled to said fixed head and responsive to said mode control signal for selectively operating said switch means, whereby the output of said chrominance channel is inhibited when said monochrome signal is reproduced, as represented by the absence of said mode control signal, and the output of said chrominance channel is not inhibited when said chrominance signal is reproduced as represented by the presence of said mode control signal.

15. The apparatus of claim 14; wherein said mode control signal is recorded in said control track in superimposed relation to said tracking control signal, said superimposed signals having distinguishable predetermined characteristics; and wherein said discriminating means is responsive to one of said characteristics and said switch control means is responsive to another of said characteristics.

16. The apparatus of claim 15; wherein said tracking control signal is a periodic signal of a first polarity and said mode control signal is a periodic signal of an opposite polarity; and wherein said switch control means comprises means responsive to said opposite polarity periodic signal for producing a switch control signal; and means for applying said switch control signal to said switch means for selectively operating said switch means.

* * * * *